United States Patent
Bozchalooi

(10) Patent No.: US 12,548,280 B2
(45) Date of Patent: Feb. 10, 2026

(54) MULTI-WAVELENGTH STRUCTURED LIGHT CAMERA SYSTEM FOR PRECISION POSITIONING AND QUALITY CONTROL

(71) Applicant: The Regents of the University of California, Oakland, CA (US)

(72) Inventor: Iman Soltani Bozchalooi, Sacramento, CA (US)

(73) Assignee: The Regents of the University of California, Oakland, CA (US)

(*) Notice: Subject to any disclaimer, the term of this patent is extended or adjusted under 35 U.S.C. 154(b) by 382 days.

(21) Appl. No.: 18/263,202

(22) PCT Filed: Feb. 10, 2022

(86) PCT No.: PCT/US2022/016037
§ 371 (c)(1),
(2) Date: Jul. 27, 2023

(87) PCT Pub. No.: WO2022/173993
PCT Pub. Date: Aug. 18, 2022

(65) Prior Publication Data
US 2024/0127568 A1 Apr. 18, 2024

Related U.S. Application Data

(60) Provisional application No. 63/147,899, filed on Feb. 10, 2021.

(51) Int. Cl.
*G06V 10/25* (2022.01)
*H04N 23/13* (2023.01)
(Continued)

(52) U.S. Cl.
CPC ............ *G06V 10/25* (2022.01); *H04N 23/13* (2023.01); *H04N 23/69* (2023.01); *H04N 23/695* (2023.01); *H04N 23/698* (2023.01)

(58) Field of Classification Search
CPC ...... G06V 10/25; G06V 10/145; G06V 10/44; G06V 10/774; H04N 23/13; H04N 23/69;
(Continued)

(56) References Cited

U.S. PATENT DOCUMENTS

| | | | |
|---|---|---|---|
| 2014/0028805 A1* | 1/2014 | Tohme | G01B 11/2518 348/47 |
| 2019/0235079 A1 | 8/2019 | Smits | |

(Continued)

OTHER PUBLICATIONS

Park et al., "Iterative Object Localization Algorithm Using Visual Images with a Reference Coordinate", EURASIp Journal on Image and Video Processing, vol. 2008, Jul. 20, 2008.
(Continued)

*Primary Examiner* — Stephen P Coleman
(74) *Attorney, Agent, or Firm* — Greer, Burns & Crain, Ltd.; Steven P. Fallon

(57) ABSTRACT

This disclosure provides a precision-positioning/quality control system capable of measuring the exact position of any given mechanical component/part of any size or shape used during an assembly process. In one aspect, a process for performing high-accuracy localization and positioning of a rigid object is disclosed. This process can begin by receiving a full image of the object. The full image is then processed by a deep-learning module to identify a set of regions of interest on the object. Next, the identified regions in the set of regions of interest are subsequently processed to identify a number of surface points within each identified region and accurately estimate their positions. After sequentially processing all the regions of interest, the process subsequently generates an accurate position estimation for the object based on the combined set of identified high-precision surface points for the set of regions of interest.

22 Claims, 5 Drawing Sheets

(51) Int. Cl.
*H04N 23/69* (2023.01)
*H04N 23/695* (2023.01)
*H04N 23/698* (2023.01)

(58) Field of Classification Search
CPC .... H04N 23/695; H04N 23/698; H04N 23/45; G01B 11/002; G01N 21/8806; G01N 21/8851; G01N 21/9515; G06T 2207/20084; G06T 2207/30164; G06T 7/001; G06T 7/521; G06T 7/73
USPC ........................................................ 382/103
See application file for complete search history.

(56) References Cited

U.S. PATENT DOCUMENTS

| | | |
|---|---|---|
| 2020/0005448 A1 | 1/2020 | Subramanian et al. |
| 2020/0232785 A1 | 7/2020 | Mosher et al. |
| 2020/0296266 A1 | 9/2020 | Koyama et al. |
| 2020/0344449 A1 | 10/2020 | Allen et al. |

OTHER PUBLICATIONS

Lu et al., "Adaptive Object Detection Using Adjacency and Zoom Prediction", Apr. 11, 2016, https://arxiv.org/abs/1512.07711.

\* cited by examiner

MULTI-WAVELENGTH STRUCTURED LIGHT CAMERA SYSTEM FOR PRECISION POSITIONING AND QUALITY CONTROL

CROSS-REFERENCE TO RELATED APPLICATION

This application claims the benefit of U.S. Provisional patent application Ser. No. 63/147,899, entitled "PZT, Multi-wavelength Structured Light Camera System for Precision Positioning and Quality Control,", filed on 10 Feb. 2021, the contents of which are incorporated by reference herein.

BACKGROUND

Field

The disclosed embodiments generally relate to manufacturing automation and quality control. More specifically, the disclosed embodiments relate to using multi-wavelength camera system to perform automatic and high-precision mechanical component localization and positioning for manufacturing automation and quality control.

Related Art

Despite the general misconception that the 21 St century production lines are extensively automated, currently most industrial manufacturing tasks are performed manually. In automotive industry for example, less than 5% of the final assembly is automated, with the remaining 95% relying on manual operators. Driven by the ever-increasing need for low-cost production and compounded with the recent developments and subsequent repercussions of COVID19 pandemic on various industries, the importance of automation has been felt more than ever. Due to generally overcrowded assembly lines where manual operators work side-by-side, many production lines had to shut down to meet CDC's COVID19 guidelines regarding social distancing. This experience is making automation an indispensable part of future as well as the current factories.

An important step in the automation of assembly tasks is the precise localization of the components of interest. In some industries, the precision levels required are often in the order of tens of microns. However, currently there is no versatile low-cost localization technology that can achieve such precision levels for arbitrary parts. Instead, this level of precision has to be achieved through extensive instrumentation and tailored to a specific component, making the effort extremely costly and voiding financial justification for automation. Other lower-cost localization systems can provide rough estimates of an object position, which is just accurate enough to avoid collision between a moving robot (or robotic arm) and an obstacle.

Hence, what is needed is a highly-accurate, low-cost, and versatile (i.e., applicable to any object of interest) technique for mechanical component localization and positioning without the drawbacks of the existing techniques.

SUMMARY

This disclosure provides a precision-positioning/quality control system that is capable of measuring the exact position (with micron to submicron level accuracy) of any given mechanical component/part of any size or shape used during an assembly process.

In one aspect, a process for performing high-accuracy localization and positioning of a rigid object is disclosed. This process can begin by receiving a full image of the object. The full image is then processed by a machine-learning module to identify a set of regions of interest on the object. This can be done by identifying a set of keypoints within each associated region of interest.

Next, for each identified region in the set of regions of interest, the following steps are performed to estimate the accurate 3D positions of a set of surface points in each identified region: acquire the coarse position of the identified region; zoom a first camera and a second camera on the identified region; project one or more probe light signals on the identified region; generate a first set of images and a second set of images of the identified region by the first camera and the second camera, respectively based on reflected probe light signals from the identified region; and estimate a surface profile of the identified region by combining the information extracted from the first set of images and the second set of images.

After sequentially processing the set of regions of interest to identify high-precision surface points for each region of interest, an accurate position estimation for the object is generated based on the combined set of identified high-precision surface points for the set of regions of interest.

In another aspect, a high-precision object localization and positioning system is disclosed. This positioning system can include: a wide-angle camera configured to capture a full image of an object; an image processor coupled to the wide angle camera and configured to process the full image to identify a set of regions of interest on the object; a first camera and a second camera at separate spatial locations and both coupled to the image processor, wherein the first camera and the second camera are configured to simultaneously zoom onto a given identified region in the set of regions of interest on the object.

The positioning system further includes a light projector coupled to the image processor and configured to zoom onto a given identified region in the set of regions on the object and subsequently project one or more probe light signals on the given identified region. Note that the first camera and the second camera are further configured to generate a first set of images and a second set of images of the given identified region, respectively, based on reflected probe light signals from the given identified region. Moreover, the image processor is further configured to accurately estimate the positions of a set of surface points within the identified region by correlating the first set of images and the second set of images and generating an accurate position estimation for the object based on a combined set of identified high-precision surface points for the set of regions.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, microprocessors, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
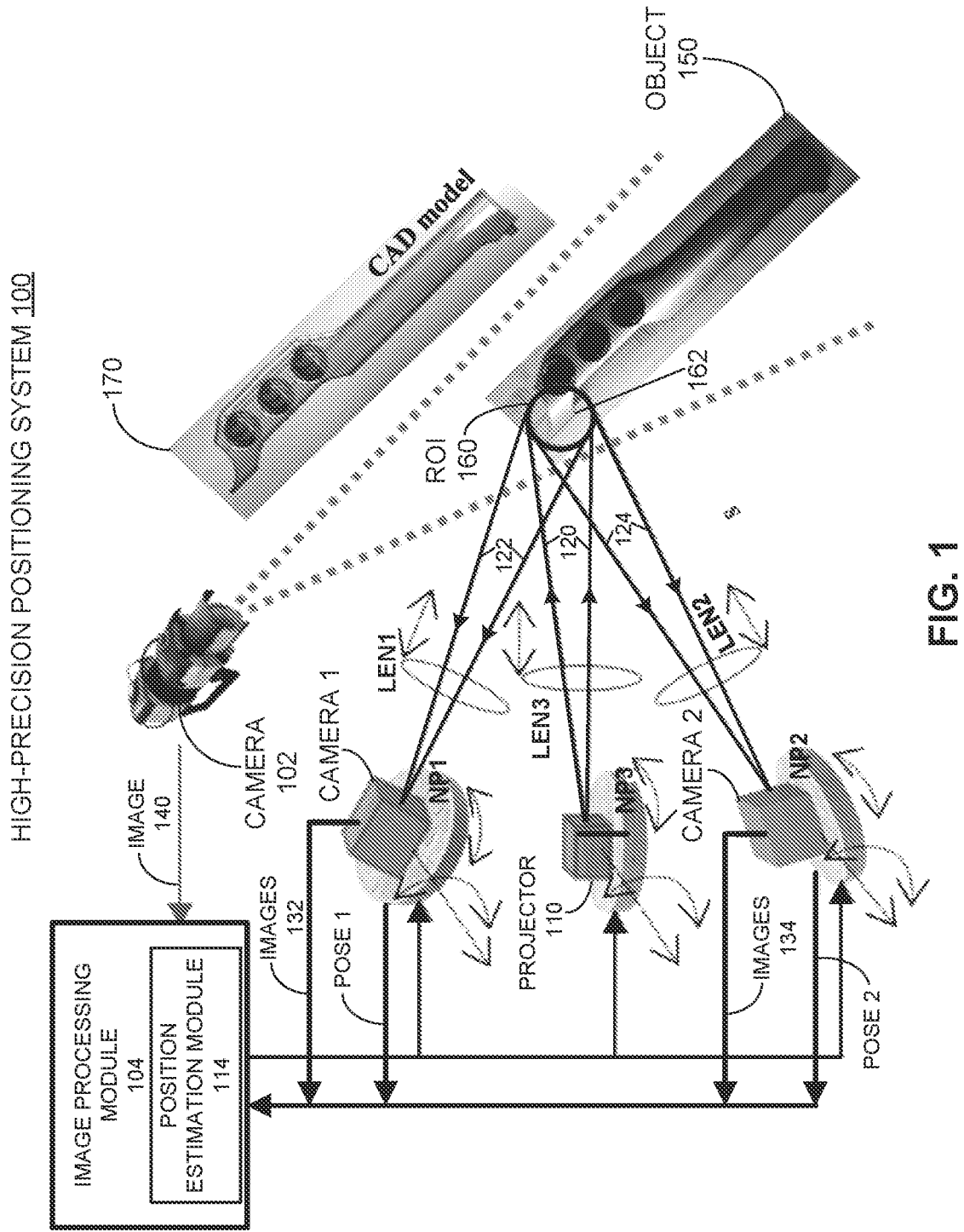
FIG. 1 shows a schematic of a disclosed high-precision positioning system 100 including two multi-spectra cameras, one multi-spectra light projector and a machine-learning architecture for keypoint detection, in accordance with the disclosed embodiments.

This disclosure provides a precision-positioning/quality control system that is capable of measuring the exact position (with micron to submicron level accuracy) of any given mechanical component/part of any size or shape used during an assembly process. FIG. 1 shows a schematic of a disclosed high-precision positioning system 100 including two multi-spectra cameras, one multi-spectra light projector and a machine-learning architecture for keypoint detection, in accordance with the disclosed embodiments.

As can be seen in FIG. 1, the disclosed high-precision positioning system 100 includes a wide-angle camera 102 configured with a field of view that can capture and observe all the parts of interest. The disclosed positioning system 100 also includes an image processing module 104 coupled to wide-angle camera 102 for processing the captured wide-angle images by wide-angle camera 102 and extracting a set of keypoints from each mechanical part of interest.

Positioning system 100 also includes two additional cameras: camera 1 and camera 2, which are spatially separated from each other. During a positioning operation, camera 1 and camera 2 will operate in unison to image the same region of an object so that images captured by camera 1 and camera 2 in a region of interest can be correlated to each other to allow precise three-dimensional (3D) positions of a number of surface points within the region of interest to be determined through triangulation. This operation concept is shown in FIG. 1, wherein both camera 1 and camera 2 are aiming at and focused on the same region of interest (ROI) 160.

Positioning system 100 additionally includes a light projector 110, which may be positioned approximately halfway between camera 1 and camera 2 in the configuration shown. During positioning operation, light projector 110, which may contain one or multiple light sources, e.g., one or multiple laser sources having multiple wavelengths, projects a number of probe light patterns onto a region of interest on an object. Light projector 110 also operates in unison with camera 1 and camera 2, as the probe light patterns emitted by light projector 110 are reflected by the object and subsequently imaged by camera 1 and camera 2. This operation concept is also shown in FIG. 1. Moreover, all three devices move in unison together from one region of interest to the next region of interest.

Positioning system 100 further includes three nano-positioning stages, denoted as NP1, NP2, and NP3, wherein each of the three nano-positioning stages carry one of the three optical devices: camera 1, camera 2, and light projector 110, in the manner shown. As can be seen in FIG. 1, each nano-positioning stage is configured to provide two degrees of rotational motions, i.e., a panning motion and a tilt motion, both with nano-scale (i.e., with a resolution of nanoradians) accuracy. Moreover, the three nano-positioning stages NP1, NP2, and NP3, are also configured to axially (i.e., linearly) move a set of lenses, denoted as LEN1, LEN2, and LENS for zooming and focusing camera 1, camera 2, and light projector 110, respectively, which can also have nanometer precisions. Note that NP1, NP2, and NP3 can be identical to each other.

In some embodiments, image processing module 104 is configured to receive a full image 140 of a part/component/object of interest 150 (or "object 150" hereinafter), wherein full image 140 may be captured by and received from wide-angle camera 102. Note that it is assumed that object 150 is a solid object. Image processing module 104 is then configured to process the full image 140 to identify a number of regions on object 150 that include distinguishable features or keypoints.

Generally speaking, unique and distinguishable features on object 150 are preferred over smooth/featureless areas. For example, the identified regions can include one or more corner regions or can be exclusively corner regions. Note that a corner point is where a number of edges intersect, which makes the point unique. In this disclosure, a unique point within an identified region, such as a corner point, is referred to as a "keypoint" of object 150. Note that these keypoints can be used both for locating the regions of interest and for guiding/positioning the cameras and the light projectors. Note also that such keypoints are useful because their coordinates can be more easily determined than indistinguishable locations on object 150. FIG. 1 illustrates an exemplary identified region of interest (ROI) 160 that contains a sharp corner 162, which can be designated as a keypoint for ROI 160.

In some embodiments, image processing module 104 includes deep-learning functionalities. Specifically, image processing module 104 can use a machine-learning model on the full image to identify the set of regions of interest. Prior to applying the machine-learning model, the machine-learning model should be trained to detect and identify a set of keypoints and subsequently a set of unique/distinguishable features in an image of the object, such as the feature within ROI 160, in a photograph of object 150. In some embodiments, to train the model, images of the object are obtained, which are preferably captured from a wide range of camera positions and orientations with respect to a stationary object, as well as under various illumination conditions. Next, the batch of images is annotated by one or more annotators, and specifically, each image in the batch is labeled based on the set of predefined distinguishable features of the image to obtain a labeled training dataset. The machine-learning model can then be trained with the labeled training dataset and the trained machine-learning model is then able to identify the set of distinguishable features in any new image of the object.

Note that the machine-learning model may be separately trained for each distinguishable feature. In this scenario, the batch of images can be annotated based on one distinguishable feature, and the machine-learning model is subsequently trained based on the annotated training images for that distinguishable feature. The annotation and training routine can then be repeated for the next distinguishable feature. In some embodiments, the machine-learning model can be obtained by synthetically generating (e.g., simulating) a batch of images of the object captured in various orientations, automatically annotating each image in the batch of images to label the set of distinguishable features on the image, and training the machine-learning model using the annotated synthetic batch of images.

After identifying a number of regions of interest including the keypoints and distinguishable features on object 50, image processing module 104 can then use the 3D coordinates of an identified keypoint within an identified region to guide/position camera 1 and camera 2, and projector 110. For example, corner keypoint 162 in the identified ROI 160 can be selected as for ROI 160. Subsequently, 3D coordinates of the selected keypoint can be transmitted to nano-positioning stages NP1, NP2, and NP3 to guide/position camera 1 and camera 2, and projector 110 toward the identified region. In some embodiments, 3D coordinates of the selected keypoint can be directly generated by wide-angle camera 102 if wide-angle camera 102 is configured as a stereo camera.

As can be seen in FIG. 1, image processing module 104 is coupled to each of camera 1, camera 2, and light projector 110 through the three nano-positioning stages NP1, NP2 and NP3 that control the rotational and linear motions of camera 1, camera 2, and light projector 110, respectively. During the disclosed positioning operation, the low-accuracy 3D positions of the extracted keypoints for a number of identified regions generated by image processing module 104 are the inputs to NP1, NP2 and NP3. Nano-positioning stages NP1, NP2 and NP3 are configured to use the 3D positions to control the pan, the zoom, and the tilt motions (also referred to as the "PZT motions") of camera 1, camera 2, and light projector 110 to zoom and focus onto the identified regions (associated with each keypoint) one after the other in a sequential manner.

During operation, after camera 1, camera 2, and light projector 110 have zoomed onto a given identified region of the object in the set of identified regions, light projector 110 then projects probe light signals 120 onto the given identified region, such as ROI 160. In some embodiments, probe light signals 120 include a set of structured patterns generated by a single light source emitted at a specific wavelength. In this embodiment, the reflected signals 122 and 124 from the identified region include reflected structured patterns at the same wavelength. As a result, each camera 1 and camera 2 will generate a separate set of images corresponding to the multiple reflected structured patterns. Next, by concurrently processing the two sets of images from the two cameras, the correspondences between various projected features between the two sets of images can be extracted.

Figure 2:
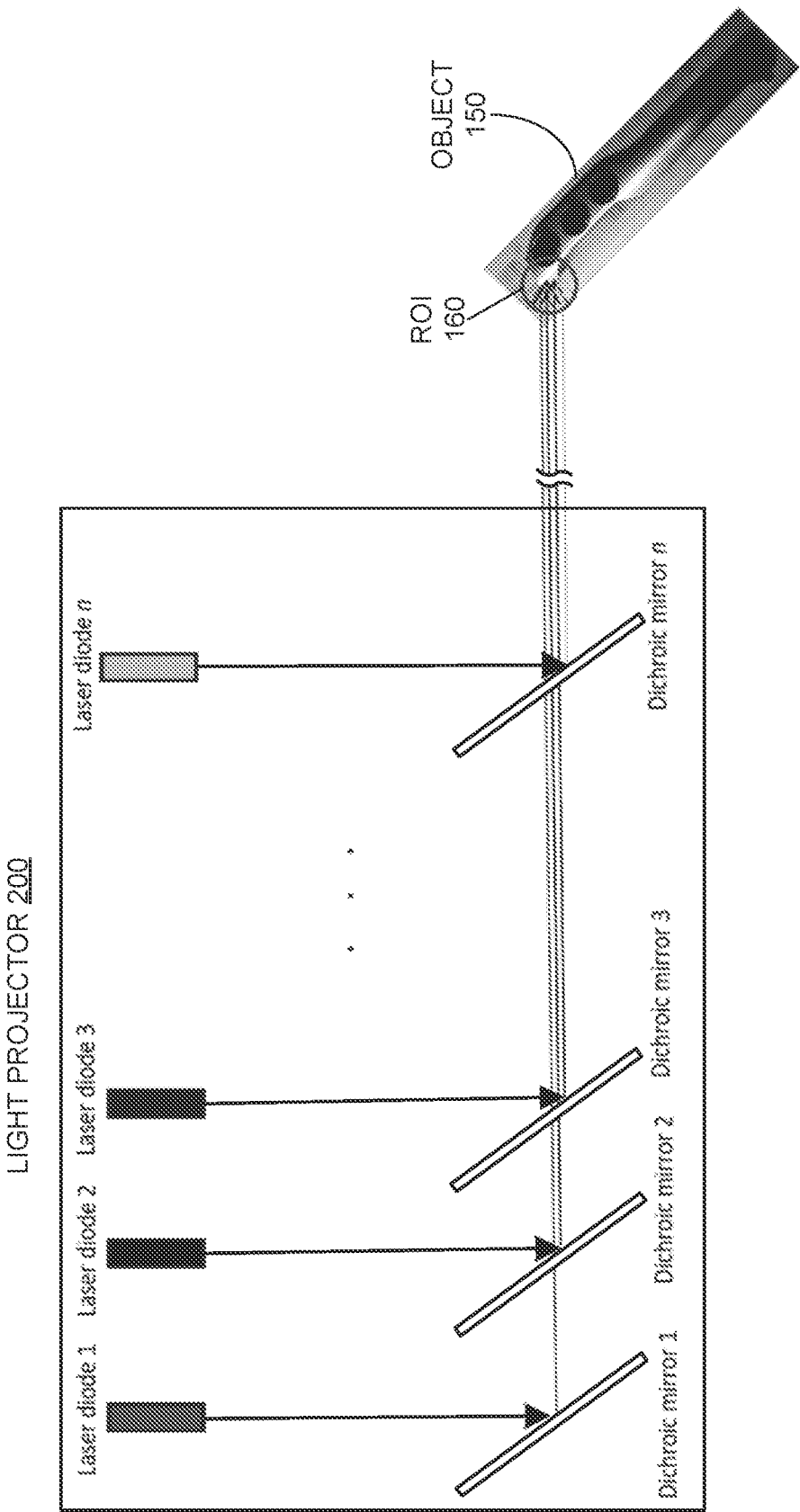
FIG. 2 illustrates an exemplary implementation of the multi-spectra light projector in FIG. 1, which can generate a set of structured patterns each at a distinct wavelength, in accordance with the disclosed embodiments.

In some alternative embodiments, probe light signals 120 include a set of structured patterns generated by multiple light sources inside light projector 110 having a set of distinct wavelengths. In other words, each structured pattern is projected by a light source in the set of light sources emitted at a distinct wavelength. FIG. 2 illustrates an exemplary implementation 200 of the multi-spectra light projector of FIG. 1, which can generate a set of structured patterns each at a distinct wavelength, in accordance with the disclosed embodiments. As can be seen in FIG. 2, light projector 200 includes a set of n laser sources, i.e., laser diode 1, laser diode 2, laser diode 3, . . . , laser diode n, which are arranged linearly in the lateral direction, and each of the n laser sources emits a structured pattern at a distinct wavelength.

Moreover, light projector 200 also includes a set of n dichroic mirrors, i.e., dichroic mirror 1, dichroic mirror 2, dichroic mirror 3, . . . , dichroic mirror n, which are also arranged linearly in the lateral direction to match up with a corresponding laser source in the vertical direction. More specifically, each dichroic mirror in the set of n dichroic mirrors is configured to reflect the light at the wavelength emitted by the matching laser diode while simply passing all other wavelengths. As a result, the specific implementation of light projector 200 combines the emissions from the set of n laser sources composed of the set of structured patterns, and simultaneously projects the combined light pattern on the ROI 160 on object 120. While the specific implementation of the light projector 200 uses dichroic mirrors to combine laser signals of different wavelengths, other implementations of the light projector can use other types of optical elements other than dichroic mirrors to achieve the multi-wavelength merging function without departing from the present disclosure.

In some embodiments, each structured pattern can be artificially and randomly generated, e.g., a mesh pattern of intersection lines. Hence, each structured pattern can create a set of artificially generated keypoints on the given identified region. In the above scenario, because the structured patterns are generated by different light sources and at different wavelengths, the structured patterns can be simultaneously projected onto the given identified region. Note that camera 1 and camera 2, which are simultaneously focused on the given identified region, are configured to receive the reflected signals 122 and 124 from the identified region, respectively. However, when the probe light signals 120 are made up of structured patterns of multiple distinct wavelengths, the reflected patterns in light signals 122 and 124 also combine multiple distinct wavelengths, and therefore may need to be separated into individual reflected patterns.

Figure 3:
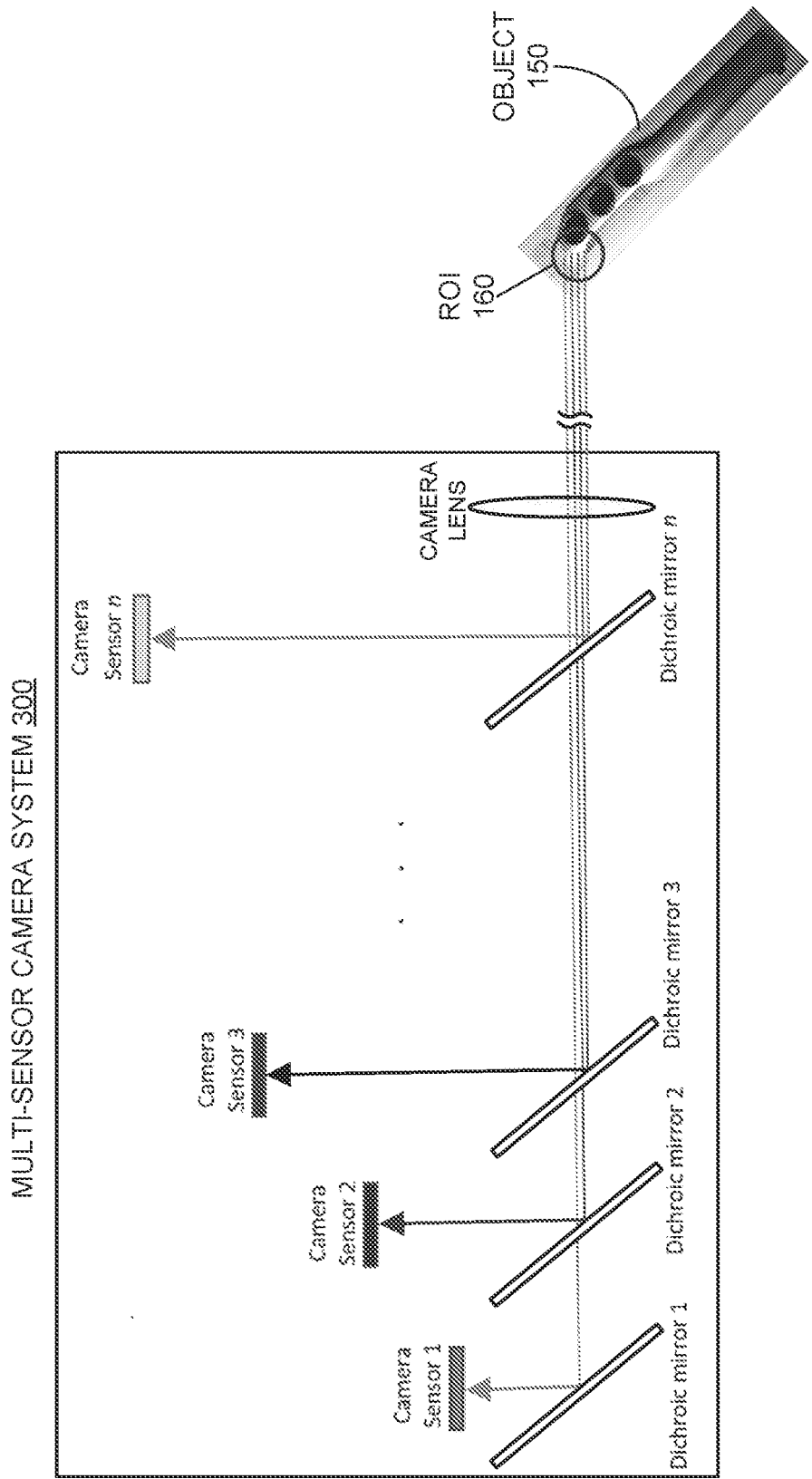
FIG. 3 illustrates an exemplary implementation of the multi-spectra cameras in FIG. 1, which can separate the received reflected distinct patterns based on the distinct wavelengths, in accordance with the disclosed embodiments.

FIG. 3 illustrates an exemplary implementation 300 of multi-spectra camera 1 or multi-spectra camera 2 in FIG. 1 which can separate the received reflected distinct patterns based on the distinct wavelengths, in accordance with the disclosed embodiments. As can be seen in FIG. 3, multi-sensor camera system 300 includes a set of n camera sensors, i.e., camera sensor 1, camera sensor 2, camera sensor 3, . . . , camera sensor n, which are arranged linearly in the lateral direction, and each of the n camera sensors is configured to detect signals at a distinct wavelength in the multiple distinct wavelengths.

Moreover, multi-sensor camera system 300 also includes a set of n dichroic mirrors, i.e., dichroic mirror 1, dichroic mirror 2, dichroic mirror 3, . . . , dichroic mirror n, which are also arranged linearly in the lateral direction to match up with a corresponding camera sensor in the vertical direction. More specifically, each dichroic mirror in the set of n dichroic mirrors is configured to reflect the incident light at the distinct wavelength to be detected by the matching camera sensor while simply passing all other wavelengths. As a result, multi-sensor camera system 300 is configured to separate/decompose the received reflected patterns of multiple distinct wavelengths one by one and direct each isolated reflected pattern at a given wavelength to a separate camera sensor configured for detecting the given wavelength. Note that in the multi-spectra camera implementation 300, distances between the set of camera sensors and the corresponding optical elements are varied so that the camera sensors all fall on the same camera image plane.

While the specific implementation of multi-sensor camera system 300 uses dichroic mirrors in the manner of optical filters to separate the received reflected patterns of multiple wavelengths, other implementations of camera 1 and camera 2 can use other types of optical filters other than dichroic mirrors to achieve the wavelength filtering function without departing from the present disclosure. In further embodiments, instead of using multiple detectors and filters, camera 1 and camera 2 and light projector 110 can be configured to perform time-division measurements, e.g., by sequentially projecting the multiple structured patterns of distinct wavelengths by light projector 110, and sequentially measuring each reflected pattern of a distinct wavelength that has been separated in time, using a single detector/sensor in camera 1 and camera 2.

Returning now to FIG. 1, in the multi-wavelength embodiments, reflected signals 122 and 124 from the identified region include multiple reflected structured patterns, each reflected structure pattern corresponding to a different wavelength. As a result, camera 1 and camera 2 will generate a first set of images 132 and a second set of images 134 corresponding to the same set of multiple reflected structured patterns, respectively. The first set of images 132 and the second set of images 134 are sent back to image processing module 104.

In the illustrated embodiments, image processing module 104 includes a position estimation module 114, which receives the first and second sets of images 132 and 134 and processes the two sets of images to accurately estimate the precise positions of a number of surface points (e.g., 3 or more points) within ROI 160, which is illustrated by and entirely inside the projected patterns. Specifically, identifying and estimating the positions of such surface points using the two sets of images 132 and 134 includes (1) determining point correspondences between surface points captured by both camera 1 and camera 2; and (2) determining 3D coordinates for the identified surface points having point-correspondences through a triangulation technique.

As an example of determining point correspondences between surface points captured by both cameras 1 and 2, note that each structured pattern projected onto the ROI can be interpreted as a matrix of is for those surface points that are on/coincide with the structured pattern (referred to as the "ON" points) and 0s for those surface points that are not on the structured pattern (referred to as the "OFF" points). Note that the size of each structure pattern is typically bigger than the area ROI, so that the entire ROI is within the structure pattern. By simultaneously projecting multiple structured patterns at different wavelengths onto a given ROI on an object, a binary vector of 1s and 0s can be assigned to each point on the surface of ROI.

For example, if we simultaneously project 5 patterns using 5 wavelengths, and observe a given surface point in the ROI from the perspective of camera 1 (e.g., using the first set of images 132), the given surface point can be an ON point for some of the 5 patterns and an OFF point for the rest of the 5 patterns. Hence, from camera 1, the given surface point can be assigned a unique binary identifier (ID), e.g., [1, 1, 0, 0, 1]. To find the corresponding point in the second set of images 134 captured by camera 2, we only need to look for a point that has the same binary ID, e.g., [1, 1, 0, 0, 1] generated based on the second set of images 134. This is because a binary ID assigned to a given point is unique and hence can be detected by two or even more cameras without any uncertainty or any need for additional computational steps for correspondence extraction. In this manner, we can identify a number of corresponding points based on the two sets of images 132 and 134 and the constructed binary IDs.

Next, the precise positions of these identified surface points within ROI 160 with the determined point correspondences can be accurately estimated through triangulation. In some embodiments, instead of assigning a binary code/ID to each surface point, a continuous none-integer vector can be created for each point instead. In further embodiments, the unique ID for each surface point can be a combination of binary and non-integer values.

In some embodiments, the projected structured patterns can be moved laterally in a controlled manner for repeated measurements and subsequently improved positioning accuracy. In other words, through such repeated measurements using the same set of projected structures, it becomes even more likely to uniquely identify/mark each point within the ROI or make multiple positioning measurements from the same points, so that the multiple measurements can be combined and their reliability and uncertainty, e.g. bias and variance can be significantly improved.

Referring back to FIG. 1, when processing each identified region in the set of regions initially selected by image processing module 104, position estimation module 114 in image processing module 104 can simultaneously receive the poses of the two cameras, i.e., pose 1 and pose 2; the axial positions of the LEN1 and LEN2; and the captured images 132 and 134 from the given identified region. Image processing module 104 can then process the above received information collectively using a conventional triangulation technique. Based on the results of the above computation, position estimation module 114 can generate an accurate estimate of the surface profile of the given identified region. Finally, the identified surface points from all regions of interest are mapped to a CAD model of object 150 for final position estimation or surface topography extraction. For example, an exemplary CAD model 170 of object 150 is shown in FIG. 1.

In some embodiments, the final position estimate for the object involves registration (i.e., solving for unknown rotations and translations) with respect to a reference coordinate system. Once the positions and orientations of the ROIs on the object are estimated, a combined position and orientation for the entire object can be calculated. One simple way to combine multiple position estimates or measurements of the same quantities is to take an average of the multiple measurements. Assuming that each individual position and pose estimate obtained from individual ROIs are affected by instrumentation and processing noise, averaging multiple measurements can reduce such noise effect and improve performance.

Figure 4:
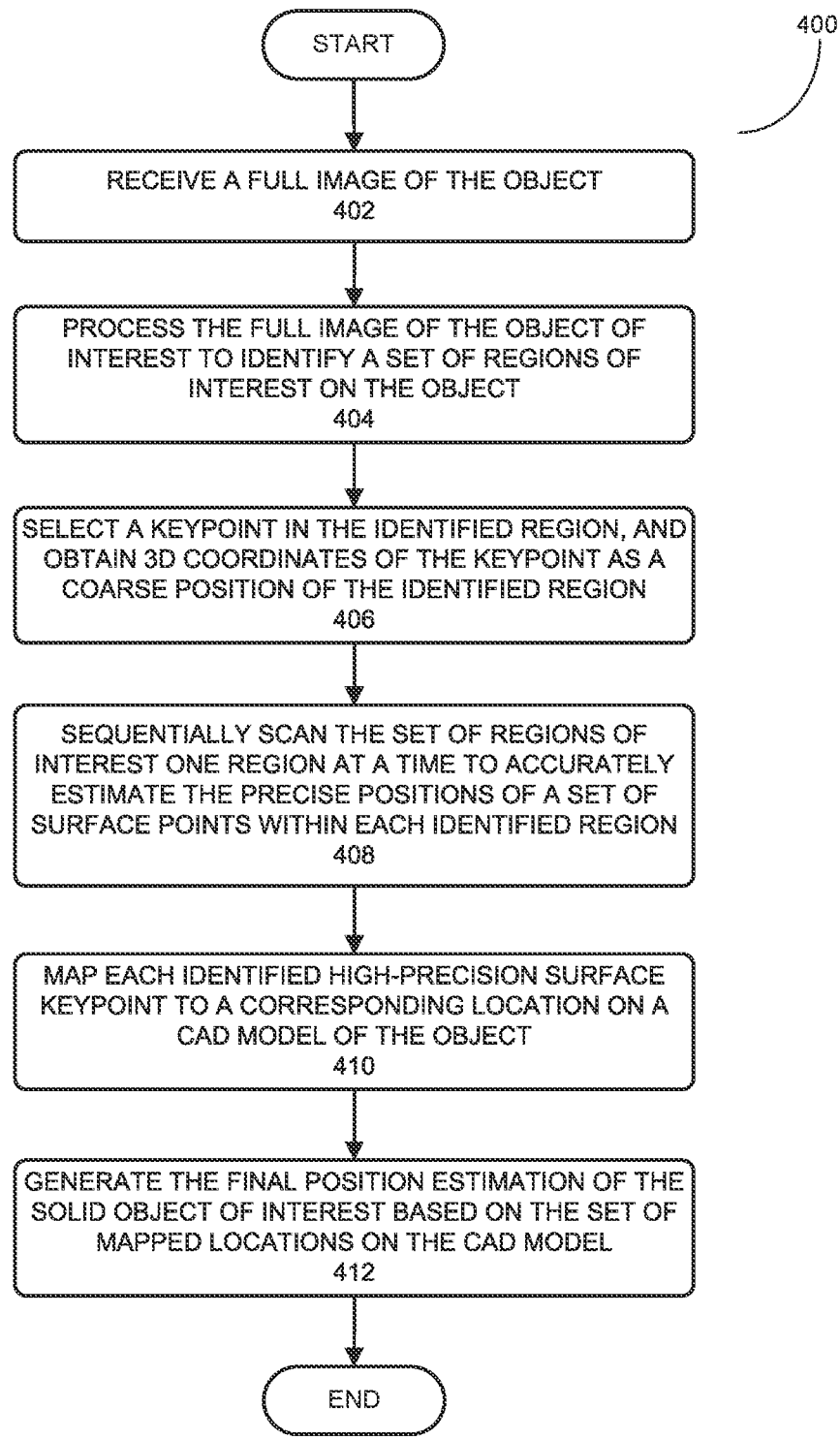
FIG. 4 presents a flowchart illustrating a process for performing high-accuracy localization and positioning of an object of interest in accordance with the disclosed embodiments.

FIG. 4 presents a flowchart illustrating a process 400 for performing high-accuracy localization and positioning of an object of interest, in accordance with the disclosed embodiments. In some embodiments, the object of interest is a rigid body object, such as an auto part.

Process 400 may begin with receipt of a full image of the object (step 402). In some embodiments, the full image of the object is captured by a wide-angle camera. Next, the full image of the object of interest is processed to identify a set of regions of interest on the object by identifying a set of keypoints on the object (step 404). In some embodiments, identifies the set of regions of interest is identified by applying a machine-learning model on the full image, wherein the machine-learning model was trained to identify a set of distinguishable features (by first identifying keypoints) from an image of the object. From the machine-learning model, three or more identified regions of interest on the object are then received, wherein each of the three or more identified regions includes at least one distinguishable feature in the set of distinguishable features.

Next, for each identified region, keypoint in the identified region is selected, and three-dimensional (3D) coordinates of the keypoint are obtained as a coarse position of the identified region (step 406). In some embodiments, the identified region is a corner region on the object, and the selected keypoint is a corner point in the corner region. The set of regions of interest are then sequentially scanned one region at a time to accurately estimate the precise positions of a set of surface points within each identified region (step 408). A more detailed embodiment of step 408 is described below in conjunction with FIG. 5.

Next, each identified high-precision surface point is mapped to a corresponding location on a CAD model of the object (step 410). Given the corresponding image points from two or more camera views, 3D positions of these surface points can be obtained through triangulation. A combined set of such 3D coordinates from multiple ROIs on the object can then be mapped to a CAD model through a point-cloud registration process that is used to find the rotation and translation quantities needed to match the extracted surface points to their corresponding points on a corresponding CAD model. The final position estimation of the solid object of interest is then generated based on the set of mapped locations on the CAD model (step 412).

Figure 5:
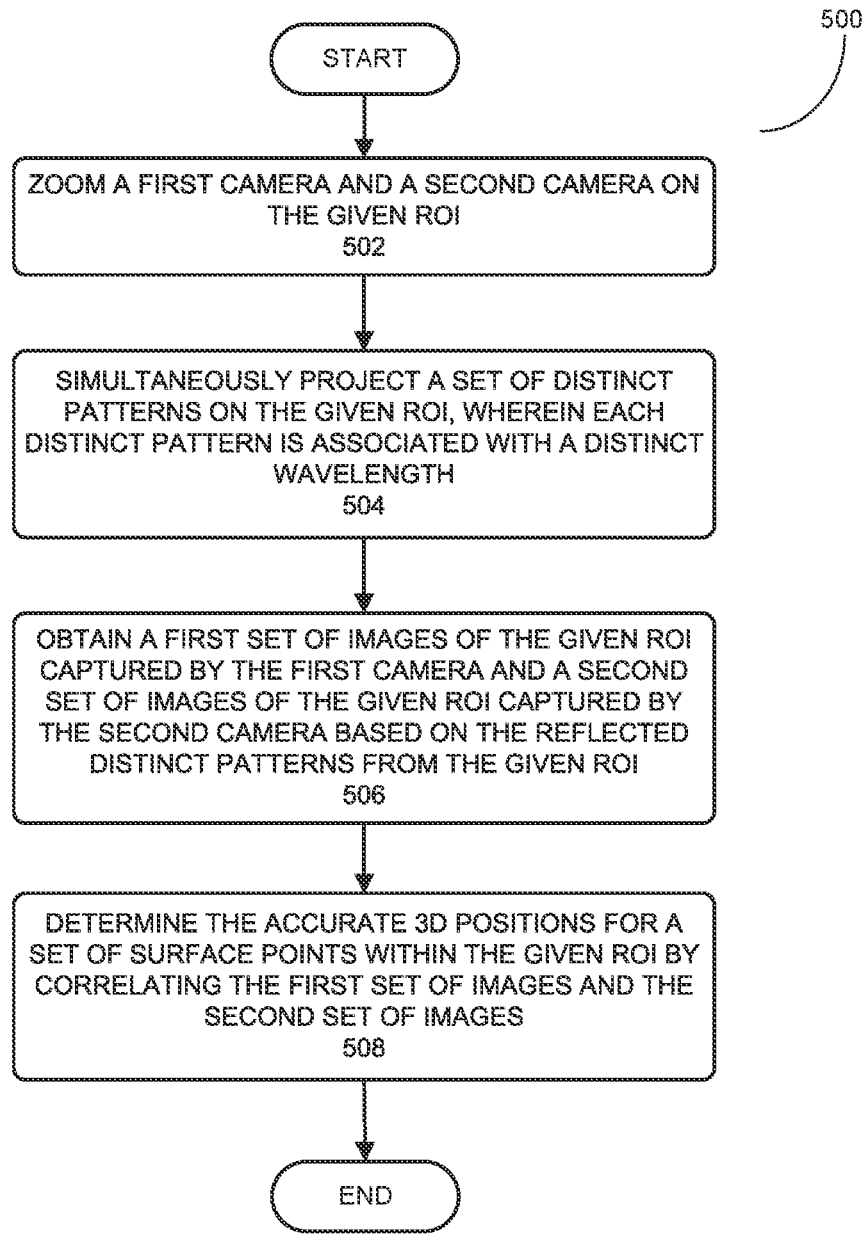
FIG. 5 presents a flowchart illustrating a process for scanning a given region of interest (ROI) of the object to accurately estimate the position of several points embedded within the projected structured pattern and form an accurate surface profile within each identified region, in accordance with the disclosed embodiments.

FIG. 5 presents a flowchart illustrating a process 500 for scanning a given region of interest (ROI) to accurately estimate the positions of several points embedded within the projected structured pattern and form an accurate surface profile within each identified region in accordance with the disclosed embodiments. To start, a first camera and a second camera are zoomed-in on the given ROI (step 502). In some embodiments, zooming the first and second cameras onto the given ROI involves: (1) providing the 3D coordinates of the keypoint of the given ROI to a first positioning stage that drives the first camera and a second positioning stage that drives the second camera; and (2) then using the first positioning stage and the second positioning stage to control a pan, a zoom, and a tilt of the first camera and the second camera, respectively, based on the 3D coordinates of the keypoints. As a result, both the first camera and the second camera are simultaneously focused on the given ROI.

A set of distinct patterns is then simultaneously projected on the given ROI, wherein each distinct pattern is associated with a distinct wavelength (step 504). Next, a first set of images of the given ROI captured by the first camera and a second set of images of the given ROI captured by the second camera based on the reflected distinct patterns from the given ROI are obtained (step 506). Subsequently, accurate 3D positions for a set of surface points within the given ROI are determined by correlating the first set of images and the second set of images (step 508). In some embodiments, the first set of images and the second set of images are correlated by determining point correspondences between surface points in the given ROI captured by both cameras.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method of performing high-accuracy localization and positioning of an object, the method comprising:
  receiving a full image of the object;
  processing the full image to identify a set of regions of interest on the object;
  for each identified region in the set of regions of interest:
    zooming a first camera and a second camera on the identified region;
    projecting one or more probe light signals on the identified region;
    generating a first set of images and a second set of images of the identified region by the first camera and the second camera, respectively based on reflected probe light signals from the identified region; and
    accurately estimating the positions of a set of surface points within the identified region by correlating the first set of images and the second set of images; and
  generating an accurate position estimation for the object based on a combined set of identified high-precision surface points for the set of regions.

2. The method of claim 1, wherein the full image of the object is captured by a camera having a field of view that covers the entirety of the object.

3. The method of claim 1, wherein processing the full image to identify the set of regions on the object includes:

applying a machine-learning model on the full image, wherein the machine-learning model was trained to identify a set of distinguishable features from an image of the object;

receiving from the machine-learning model three or more identified regions on the object, wherein each of the three or more identified regions includes at least one distinguishable feature in the set of distinguishable features; and for each identified region:
  selecting a keypoint in the identified region to represent the identified region; and
  obtaining three-dimensional (3D) coordinates of the keypoint as a coarse position of the identified region.

4. The method of claim 3, wherein the identified region is a corner region on the object, and wherein the selected keypoint is a corner point in the corner region.

5. The method of claim 3, wherein zooming the first camera and the second camera on the identified region includes:
  providing the 3D coordinates of the keypoint to a first positioning stage that drives the first camera and a second positioning stage that drives the second camera; and
  using the first positioning stage and the second positioning stage to control a pan, a zoom, and a tilt of the first camera and the second camera, respectively, based on the 3D coordinates, thereby causing the first camera and the second camera to simultaneously focus on the identified region corresponding to the keypoint.

6. The method of claim 3, wherein prior to applying the machine-learning model, the method further comprises:
  receiving a batch of images of the object captured in various orientations;
  annotating each image in the batch of images to label the set of distinguishable features on the image; and
  training the machine-learning model using the annotated batch of images.

7. The method of claim 3, wherein prior to applying the machine-learning model, the method further comprises:
  synthetically generating, e.g., through simulating, a batch of images of the object captured in various orientations;
  automatically annotating each image in the batch of images to label the set of distinguishable features on the image; and
  training the machine-learning model using the annotated synthetic batch of images.

8. The method of claim 1, wherein the one or more probe light signals includes a set of distinct patterns.

9. The method of claim 8, wherein projecting the one or more probe light signals on the identified region includes projecting the set of distinct patterns on the identified region using a single-wavelength light source.

10. The method of claim 8, wherein projecting the one or more probe light signals on the identified region includes simultaneously projecting the set of distinct patterns on the identified region, wherein each distinct pattern is projected by a light source in a set of light sources emitting at a distinct wavelength.

11. The method of claim 8, wherein each of the first set of images and the second set of images includes the projected images of the set of distinct patterns over the identified region.

12. The method of claim 1, wherein accurately estimating the positions of a set of surface points within the identified region by correlating the first set of images and the second set of images includes:
  receiving poses of the first camera and the second camera when the first set of images and the second set of images are being captured;
  receiving axial positions of the lenses on the first camera and the second camera when the first set of images and the second set of images are being captured; and
  combining the received poses of the cameras and the received axial positions of the camera lenses with the first set of images and the second set of images to obtain the accurate positions of the set of surface points by correlating the first set of images and the second set of images surface points.

13. The method of claim 1, wherein generating the final position estimation for the object based on the combined set of identified high-precision surface points for the set of regions includes:
  mapping each identified high-precision surface point in the combined set of identified high-precision surface points to a corresponding location on a CAD model of the object; and
  generating the final position estimation for the object based on the set mapped locations on the CAD model.

14. A high-precision object localization and positioning system, comprising:
  a wide-angle camera configured to capture a full image of an object;
  an image processor coupled to the wide angle camera and configured to process the full image to identify a set of regions of interest on the object;
  a first camera and a second camera at separate spatial locations and both coupled to the image processor, wherein the first camera and the second camera are configured to simultaneously zoom onto a given identified region in the set of regions of interest on the object;
  a light projector coupled to the image processor and configured to:
    zoom onto a given identified region in the set of regions on the object; and
    subsequently project one or more probe light signals on the given identified region;
  wherein the first camera and the second camera are further configured to generate a first set of images and a second set of images of the given identified region, respectively, based on reflected probe light signals from the given identified region; and
  wherein the image processor is further configured to:
    accurately estimating the positions of a set of surface points within the identified region by correlating the first set of images and the second set of images; and
    generate an accurate position estimation for the object based on a combined set of identified high-precision surface points for the set of regions.

15. The system of claim 14, wherein the image processor is configured to identify the set of regions on the object by:
  applying a machine-learning model on the full image, wherein the machine-learning model was trained to identify a set of distinguishable features on the object;
  receiving, from the machine-learning model, three or more identified regions on the object, wherein each of the three or more identified regions includes at least one distinguishable feature in the set of distinguishable features; and
  for each identified region:
    selecting a keypoint in the identified region to represent the identified region; and obtaining 3D coordinates of the keypoint as a coarse position of the identified region.

16. The system of claim 14, wherein each region in the set of regions is a corner region on the object, and wherein the selected keypoint is a corner point in the corresponding corner region.

17. The system of claim 14, wherein the first camera is positioned on a first positioning stage and the second camera is positioned on a second positioning stage, and wherein the first positioning stage and the second positioning stage are configured to:

receive the 3D coordinates of the keypoint; and control a pan, a zoom, and a tilt of the first camera and the second camera, respectively, based on the 3D coordinates, thereby causing the first camera and the second camera to simultaneously focus on the identified region corresponding to the keypoint.

18. The system of claim 14, wherein the light projector includes a single-wavelength light source, and wherein the light projector is configured to project the one or more probe light signals by projecting a set of distinct patterns on the identified region using the single-wavelength light source.

19. The system of claim 14, wherein the light projector includes a set of light sources emitting at a set of distinct wavelengths, and wherein the light projector is configured to project the one or more probe light signals by simultaneously projecting a set of distinct patterns on the identified region at the set of distinct wavelengths using the set of light sources.

20. The system of claim 14, wherein the image processor is further configured to uniquely identify the one or more high-precision surface points within the given identified region by:

receiving poses of the first camera and the second camera when the first set of images and the second set of images are being captured;

receiving axial positions of the lenses on the first camera and the second camera when the first set of images and the second set of images are being captured; and combining the received poses of the cameras and the received axial positions of the camera lenses with the first set of images and the second set of images to obtain the positions of the set of surface points by correlating the first set of images and the second set of images surface points.

21. The system of claim 14, wherein the image processor is further configured to generate the position estimation for the object by:

mapping each identified surface point to a corresponding location on a CAD model of the object; and generating the final position estimation based on the set mapped locations on the CAD model.

22. The system of claim 14, wherein each of the first camera and the second camera is a multi-spectra camera.

\* \* \* \* \*